United States Patent [19]
Shikano

[11] Patent Number: 5,600,510
[45] Date of Patent: Feb. 4, 1997

[54] DISK APPARATUS WITH SHIELDING MEMBER IN A HEAD MOVING RANGE

[75] Inventor: Kazunori Shikano, Higashine, Japan

[73] Assignee: Fujitsu Limited, Japan

[21] Appl. No.: 321,457

[22] Filed: Oct. 11, 1994

Related U.S. Application Data

[63] Continuation of Ser. No. 60,348, May 11, 1993, abandoned.

[30] Foreign Application Priority Data

May 13, 1992 [JP] Japan ................................ 4-119370

[51] Int. Cl.⁶ .............................. G11B 5/10; G11B 33/14
[52] U.S. Cl. ......................... 360/97.02; 360/128
[58] Field of Search ........................... 360/97.01, 97.02, 360/97.03, 97.04, 98.01, 105, 106, 128, 129

[56] References Cited

U.S. PATENT DOCUMENTS

| | | | |
|---|---|---|---|
| 4,402,025 | 8/1983 | Anderson et al. | 360/98 |
| 4,430,679 | 2/1984 | van de Bult | 360/106 |
| 4,924,337 | 5/1990 | Repphun et al. | 360/128 |
| 4,935,830 | 6/1990 | Hiraoka et al. | 360/128 |
| 5,060,103 | 10/1991 | Ohtsuka | 360/128 |
| 5,329,412 | 7/1994 | Stefansky | 360/97.01 |

FOREIGN PATENT DOCUMENTS

| | | | |
|---|---|---|---|
| 5897161 | 12/1981 | Japan . | |
| 60-85796 | 6/1985 | Japan . | |
| 63-204508 | 8/1988 | Japan . | |
| 018578 | 1/1989 | Japan | 360/97.01 |
| 0160889 | 3/1989 | Japan | 369/75.1 |
| 02216897 | 8/1990 | Japan . | |
| 0314800 | 2/1991 | Japan . | |
| 0323890 | 3/1991 | Japan . | |
| 0440691 | 2/1992 | Japan . | |

OTHER PUBLICATIONS

Elliott et al, "Magnetic Shield for Disk File," IBM TDB, vol. 19, No. 4, Sep. 1976, pp. 1437–1438.

Dickie et al, "Magnetic Shield Assembly," IBM TDB, vol. 19, No. 4, Sep. 1976, p. 1439.

*Primary Examiner*—Stuart S. Levy
*Assistant Examiner*—William J. Klimowicz
*Attorney, Agent, or Firm*—Greer, Burns & Crain, Ltd.

[57] ABSTRACT

A disk apparatus includes a rotatable disk having at least one recording surface, a head for reading or writing information from or to the rotatable disk, a head drive for moving the head across the recording surface of the rotatable disk within a head moving range, and an enclosure for housing therein the rotatable disk, the head and the head drive. A printed circuit board is mounted on the enclosure. A shielding member is attached to the outer surface of the enclosure and located in a space defined between the enclosure and the printed circuit board. The shielding member has a size substantially corresponding to the head moving range.

10 Claims, 4 Drawing Sheets

DISK APPARATUS WITH SHIELDING MEMBER IN A HEAD MOVING RANGE

RELATED APPLICATION

This is a continuation of application Ser. No. 08/060,348, filed on May 11, 1993 now abandoned.

BACKGROUND OF THE INVENTION

1. This invention relates to a disk apparatus. More particularly, this invention relates to a disk apparatus comprising: at least one rotatable disk having at least one recording surface; at least one head for reading or writing information from or to said rotatable disk and head drive means for moving said head over said recording surface of the rotatable disk; and an enclosure for housing therein at least said rotatable disk, said head and said drive means.

2. Description of the Related Art

Recently, a highly sophisticated disk apparatus having a high recording capacity has been required in the related technical fields. However, due to the effort to attain such a high density, the head in the disk apparatus may be easily affected by external electrical noise.

Therefore, it is necessary to provide an electrical shielding means so that the disk apparatus operates without being affected by any external noise. In the prior art, a disk apparatus having an enclosure provided with a shielding means is known. For example, Japanese Unexamined Patent Publication (Kokai) No. 60-85796 discloses a disk apparatus having an enclosure which is covered by a shielding plate arranged between the enclosure and a printed circuit board. Japanese Unexamined Patent Publication (Kokai) No. 63-204508 discloses a magnetic head assembly of a disk apparatus providing with a shielding member for protecting electric elements on the printed circuit board. Japanese Unexamined Patent Publication (Kokai) No. 2-216897 discloses an shielded enclosure for housing therein electronic elements or apparatus. Japanese Unexamined Patent Publication (Kokai) No. 4-40691 discloses a disk apparatus including a housing made of resin and a shielding layer arranged on the inner surface of the housing.

Since the above-mentioned shielding member known in the prior art covers substantially the entire surface of the printed circuit board, the electrical shielding effects can be fully attained. However, the cost for the shielding member is high.

Unexamined Patent Publications (Kokai) No. 58-97161 and No. 3-23890 disclose a magnetic disk apparatus including a shielding means which is arranged so as to cover the moving region of the magnetic head. Also, Unexamined Patent Publication (Kokai) No. 3-14800 discloses a magnetic disk apparatus having a housing and a shielding means arranged on the inner surface of the housing so as to cover the area corresponding to the moving region of the magnetic head.

As the above-mentioned shielding member is arranged to cover only the moving region of the magnetic head, the cost for the shielding member can be reduced. However, the shielding member does not cover the printed circuit board and, therefore, the electrical elements, such as integrated circuits or the like, cannot be fully shielded, so that these electrical elements may be affected by external electrical noise.

SUMMARY OF THE INVENTION

An object of the present invention is to provide a disk apparatus including a shielding member in which the cost for the shielding member can be reduced.

Another object of the present invention is to provide a disk apparatus including a shielding member in which electrical elements, such as integrated circuits or the like, on the printed circuit board can fully be shielded.

According to one aspect of the present invention, there is provided a disk apparatus comprising: at least one rotatable disk having at least one recording surface; at least one head for reading or writing information from or to said rotatable disk; head drive means for moving said head over said recording surface of the rotatable disk within a head moving range; an enclosure for housing therein at least said rotatable disk, said head and said drive means, said enclosure having an outer surface thereof; a printed circuit board mounted on said enclosure; and a shielding member attached to said outer surface of the enclosure and located in a space defined between said enclosure and said printed circuit board, said shielding member having a size substantially corresponding to said head moving range.

According to another aspect of the present invention, there is provided a disk apparatus comprising: at least one rotatable disk having at least one recording surface; at least one head for reading or writing information from or to said rotatable disk; head drive means for moving said head over said recording surface of the rotatable disk; an enclosure for housing therein at least said rotatable disk, said head and said drive means, said enclosure having an outer surface thereof; a printed circuit board mounted on said enclosure; at least one electronic element mounted on a surface of said printed circuit board facing to said enclosure; and a shielding member attached to said outer surface of the enclosure, said shielding member having a size substantially covering said electronic element mounted on said printed circuit board.

DESCRIPTION OF THE PREFERRED EMBODIMENTS

Figure 1:
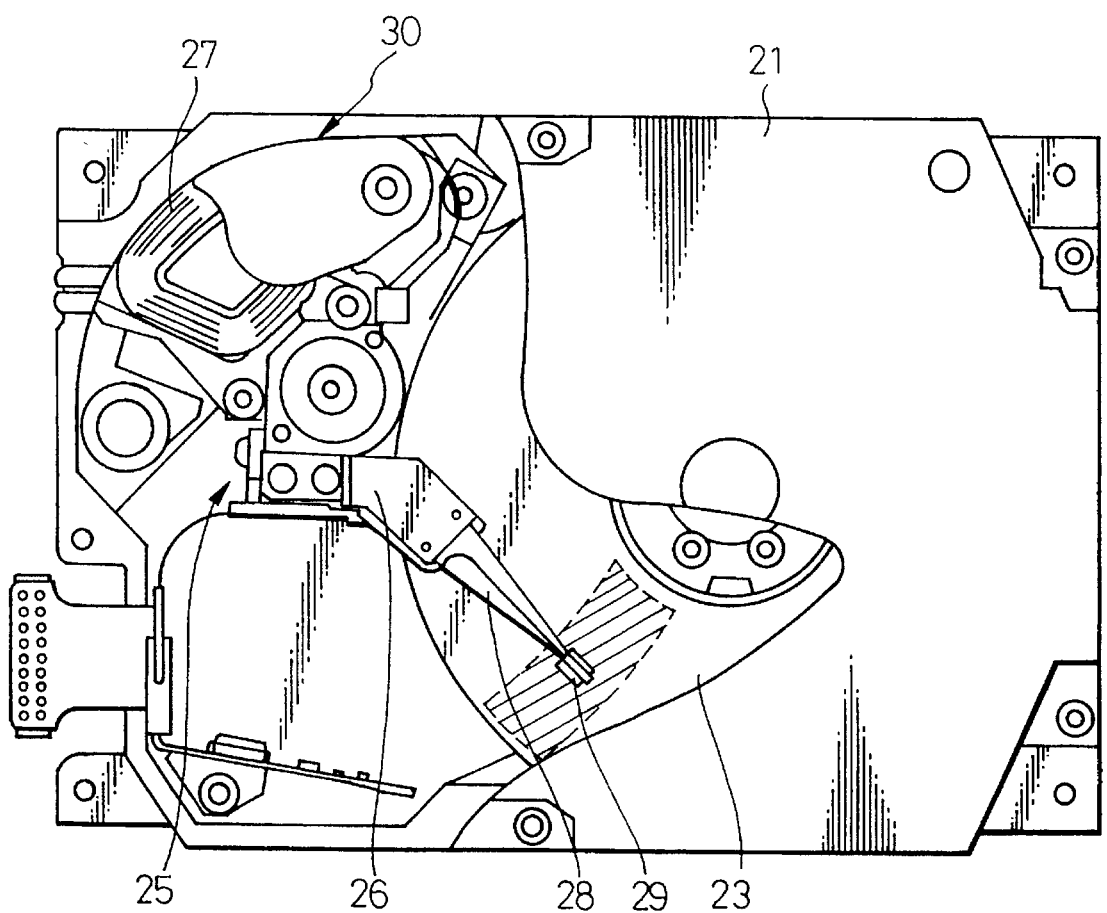
FIG. 1 is a plan view, partially a horizontal cross-sectional view, of an embodiment of a disk apparatus according to the present invention.
Figure 2:
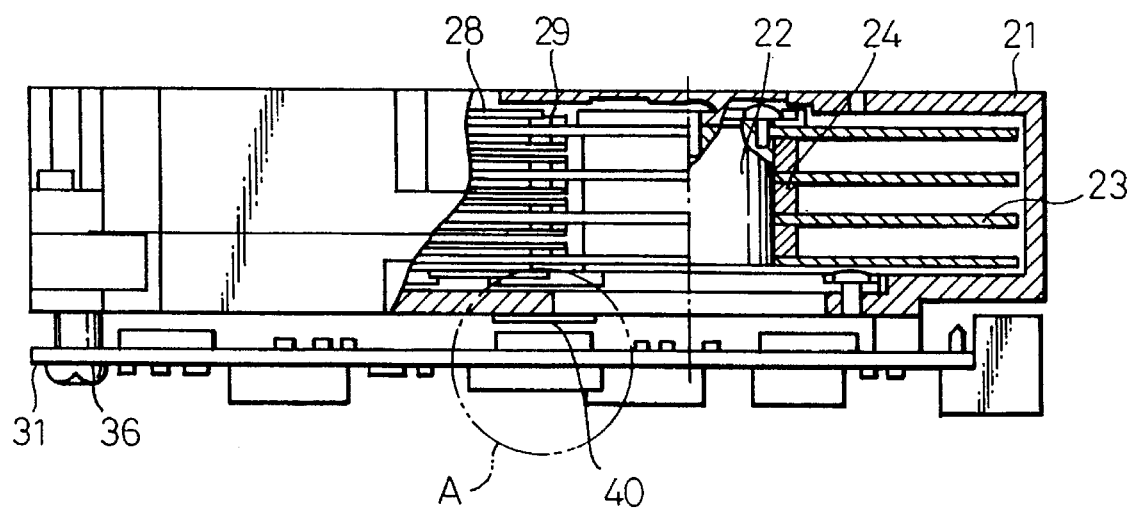
FIG. 2 is a front elevational view, partially a front vertical cross-sectional view, of the disk apparatus shown in FIG. 1.
Figure 3:
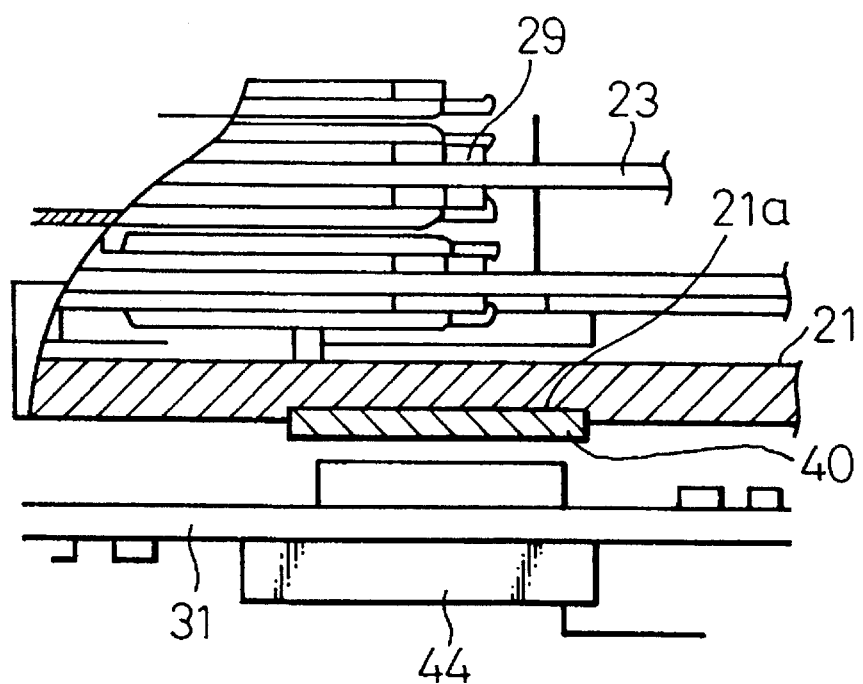
FIG. 3 is an enlarged view illustrating a part of FIG. 2.
Figure 4:
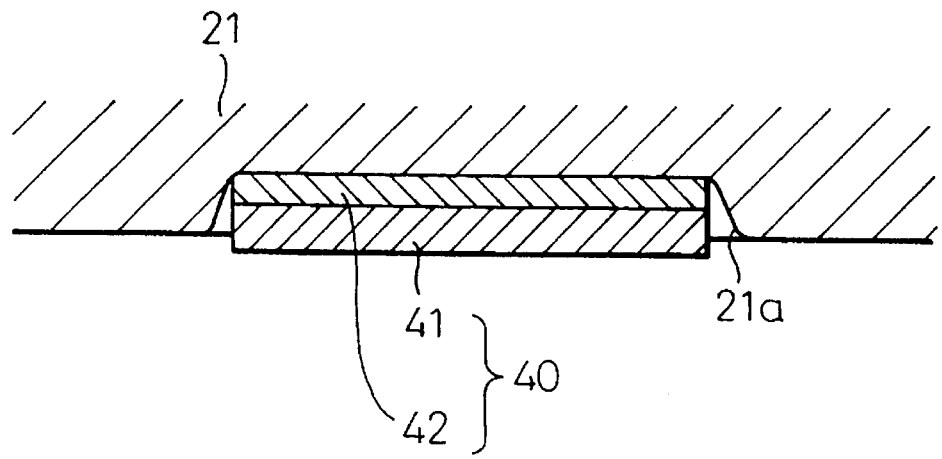
FIG. 4 is a view illustrating a mount of a shield member used in the apparatus shown in FIG. 2.

Referring now to FIGS. 1 through 4, there is shown an embodiment of a disk apparatus according to the present invention. As shown in these drawings, the disk apparatus comprises an enclosure 21, a rotating spindle 22 rotatably mounted in the enclosure 21 and rotatingly driven by a spindle motor, not shown in the drawings, and a plurality of disks 23 (four disks in the illustrated embodiment) mounted on the cylindrical outer surface of the rotating spindle 22 by means of annular spacers 24.

A head arm assembly 25 is rotatably or swingingly mounted in the enclosure 21. One end of the head arm assembly 25 with respect to the rotation center is provided with a plurality of head arms 26 (eight head arms in the illustrated embodiment) each extending along the surface of the respective disk 23 and the other end of the head arm assembly 25 is provided with a coil 27. A top end of the respective head arms 26 is provided by means of the spring head 28 with a head for reading/writing data or information from/to the corresponding disk 23.

A magnetic circuit 30 is provided on the other end of the head arm assembly 25. The above-mentioned coil 27 is arranged in the magnetic gap of the magnetic circuit 30, so that the magnetic circuit 30 and the coil 27 cooperate to constitute a moving coil type motor (VCM).

A printed circuit board 31 is mounted on the enclosure 21 by means of screws 36 and provided with various circuits units, such as a control circuit for the disk apparatus.

The outer surface of the enclosure 21 facing to the printed circuit board 31 is provided with a recess 21a on an area corresponding to the head moving region (the region indicated by a hatching in FIG. 1). In this recess 21a, a shield sheet 40 is disposed. The shield sheet 40 comprises a copper foil 41 as an electrically shielding material and a tape 42 having adhesive both sides.

Both the printed circuit board 31 and the outer surface of the enclosure 21 to which the shield sheet 40 is attached are in parallel to the rotatable disks 23. Therefore, the area on which the shield sheet 40 should be arranged can easily be defined as a projected area of the head moving region. As seen from FIG. 4, it is advantageous that the depth of the recess 21a is substantially the same or a little smaller than the thickness of the shield sheet 40.

The operation of the above-mentioned embodiment according to the present invention will now be described. The disks 23 are unitally rotated at a high speed (about 3,600 rpm) by the spindle motor, not shown. When an electric current is applied to the coil 27 arranged in the magnetic gap of the magnetic circuit 30, the coil 27 generates a driving force, so that the head arm assembly 25 is swingingly moved and, therefore, the head 29 is moved to a certain position of the disk surface. Thus, the head 29 conducts a reading or writing operation of data from or to the prescribed disk 23.

According to the above-mentioned structure, since the shield sheet 40 is provided to cover the head moving region, the electrical noise which would be generated in the printed circuit board 31 can be prevented from affecting the head 29.

Also, the area corresponding to the shield sheet 40 in the embodiment is much smaller than that of the conventional shield sheet and, therefore, a cost for such a shield sheet can significantly be reduced.

Figure 5:
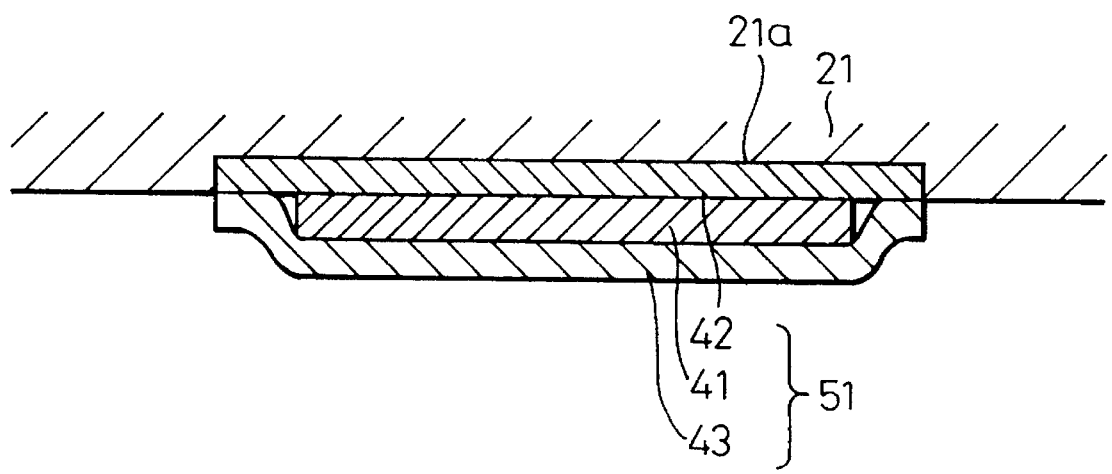
FIG. 5 is a view illustrating another embodiment of a disk apparatus according to the present invention.

Referring now to FIG. 5, a second embodiment of the present invention will now be described. Only the difference between the first embodiment and this second embodiment, i.e., only the construction of the shield sheet 40 will be explained.

The shield sheet 51 in this embodiment comprises a tape 41 having both adhesive sides, a copper foil 41 and a polyester insulation film 43 for insulating with respect to the printed circuit board. In this second embodiment, the same merits or effects as the first embodiment can be obtained.

It should be understood by those skilled in the art that the foregoing description relates to only some preferred embodiments of the disclosed invention, and that various changes and modifications may be made to the invention without departing from the spirit and scope thereof.

I claim:
1. A disk apparatus comprising:
   at least one rotatable disk having at least one recording surface;
   at least one head for reading or writing information from or to said rotatable disk;
   head drive means for moving said head along said recording surface of the rotatable disk within a head moving range;
   an enclosure having a generally uniform thickness for housing therein at least said rotatable disk, said head and said drive means, said enclosure having an outer surface thereof provided with a region of reduced thickness forming a recess over said head moving range, wherein the recess lies within the generally uniform thickness of adjacent portions of the enclosure;
   a printed circuit board mounted on said enclosure; and
   a shielding member for shielding the head from external electrical noise within head moving range, said shielding member attached to said outer surface of the enclosure positioned within said recess, having a shape corresponding to said recess to facilitate positioning of the shielding member therewithin, and located in a space defined between said enclosure and said printed circuit board, said shielding member having a size substantially corresponding to said head moving range.

2. A disk apparatus as set forth in claim 1, wherein said printed circuit board and said outer surface of the enclosure to which said shielding member is attached are in parallel to said rotatable disk.

3. A disk apparatus as set forth in claim 1, wherein said printed circuit board comprises at least a part of controlling means for controlling said head drive means.

4. A disk apparatus as set forth in claim 1, wherein said shielding member comprises a copper foil and a tape having both adhesive sides for adhering said copper foil to said outer surface of the enclosure.

5. A disk apparatus as set forth in claim 4, wherein said shielding member further comprises a polyester film; said polyester film covering said copper foil.

6. A disk apparatus comprising:
   at least one rotatable disk having at least one recording surface;
   at least one head for reading or writing information from or to said rotatable disk;
   head drive means for moving said head along said recording surface of the rotatable disk within a head moving range;
   an enclosure having a generally uniform thickness for housing therein at least said rotatable disk, said head and said drive means, said enclosure having an outer surface thereof provided with a region of reduced thickness forming a recess over said recording surface, wherein the recess lies within the generally uniform thickness of adjacent portions of the enclosure;
   a printed circuit board mounted on said enclosure;
   at least one electronic element mounted on a surface of said printed circuit board facing to said enclosure; and
   a shielding member for shielding the head from external electrical noise within head moving range, said shielding member attached to said outer surface of the enclosure positioned within said recess, having a shape corresponding to said recess to facilitate positioning of the shielding member therewithin, and located within an area corresponding to said head moving range, said shielding member having a size substantially covering said electronic element mounted on said printed circuit board.

7. A disk apparatus as set forth in claim 6, wherein said printed circuit board and said outer surface of the enclosure to which said shielding member is attached are in parallel to said rotatable disk.

8. A disk apparatus as set forth in claim 6, wherein said printed circuit board comprises at least a part of controlling means for controlling said head drive means.

9. A disk apparatus as set forth in claim 6, wherein said shielding member comprises a copper foil and a tape having both adhesive sides for adhering said copper foil to said outer surface of the enclosure.

10. A disk apparatus as set forth in claim 9, wherein said shielding member further comprises a polyester film for covering said copper foil.

* * * * *

UNITED STATES PATENT AND TRADEMARK OFFICE
CERTIFICATE OF CORRECTION

PATENT NO. : 5,600,510
DATED : Feb. 4, 1997
INVENTOR(S) : Kazunori Shikano

It is certified that error appears in the above-indentified patent and that said Letters Patent is hereby corrected as shown below:

Column 3, line 38, delete "29" and insert --23--.

Column 3, line 39, delete "29" and insert --23--.

Column 4, line 60, delete "to".

Column 3, line 58, delete the first occurrence of "41" and insert --42--.

Signed and Sealed this

Twenty-fifth Day of November, 1997

Attest:

BRUCE LEHMAN

Attesting Officer

Commissioner of Patents and Trademarks